US011935512B2

(12) United States Patent
Lu et al.

(10) Patent No.: US 11,935,512 B2
(45) Date of Patent: Mar. 19, 2024

(54) ADAPTIVE NOISE CANCELLATION AND SPEECH FILTERING FOR ELECTRONIC DEVICES

(71) Applicant: Apple Inc., Cupertino, CA (US)

(72) Inventors: Yang Lu, San Jose, CA (US); Andrew P. Bright, Los Gatos, CA (US); Fatos Myftari, San Jose, CA (US); Vasu Iyengar, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/746,930

(22) Filed: May 17, 2022

(65) Prior Publication Data

US 2023/0377554 A1 Nov. 23, 2023

(51) Int. Cl.
*G10K 11/178* (2006.01)

(52) U.S. Cl.
CPC .............................. *G10K 11/17853* (2018.01)

(58) Field of Classification Search
None
See application file for complete search history.

(56) References Cited

U.S. PATENT DOCUMENTS 9,607,602 B2 3/2017 Po et al.
9,706,288 B2 7/2017 Terlizzi
10,497,357 B2 12/2019 Christoph
10,535,362 B2 1/2020 Bryan et al.
10,657,950 B2 5/2020 Hua et al.
2012/0259628 A1* 10/2012 Siotis ..................... H04R 3/005 381/71.1
2015/0256660 A1* 9/2015 Kaller ................... H04M 1/585 379/391
2016/0353195 A1* 12/2016 Lott ..................... H04R 1/1041

* cited by examiner

*Primary Examiner* — Kenny H Truong
(74) *Attorney, Agent, or Firm* — BAKERHOSTETLER

(57) ABSTRACT

Aspects of the subject technology provide for generation of a self-voice signal by an electronic device that is operating in an active noise cancellation mode. In this way, during a phone call, a video conference, or while listening to audio content, a user of the electronic device may benefit from active cancellation of ambient noise while still being able to hear their own voice when they speak. In various implementations described herein, the concurrent self-voice and automatic noise cancellation features are facilitated by accelerometer-based control of sidetone and/or active noise cancellation operations.

21 Claims, 6 Drawing Sheets

ADAPTIVE NOISE CANCELLATION AND SPEECH FILTERING FOR ELECTRONIC DEVICES

TECHNICAL FIELD

The present description relates generally to processing audio signals, including, for example, adaptive noise cancellation and speech filtering for electronic devices.

BACKGROUND

An electronic device may include one or more microphones. The one or more microphones may produce audio signals which include sound from a source, such as a user of the electronic device speaking into the device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
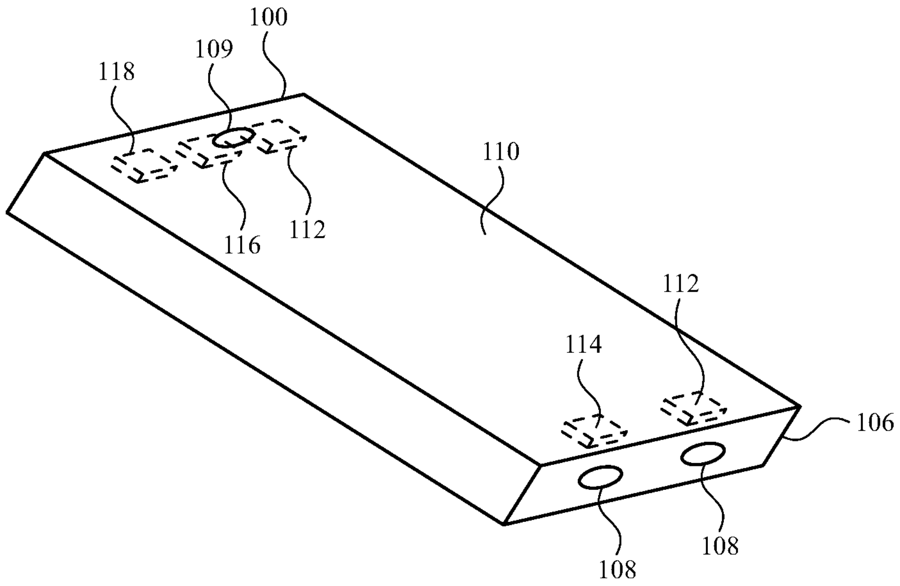
FIG. 1 illustrates a diagram of an example electronic device that may implement aspects of the subject technology in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic devices such as a smart phones may operate a speaker of the electronic device to output at least a version of a user's own voice. This version of the user's own voice may be generated based on sidetone signal generated by the electronic device to include the version of the user's own voice. The speaker may be operated to output the version of the user's own voice based on the sidetone signal while the electronic device is operated in various operational modes, such as during a phone call, and/or while wearing audio devices such as headphones or earbuds that can impede the user directly hearing their own voice. In one or more implementations, this output of a sidetone signal may be provided at a fairly low volume, to allow a caller to get a sense of the volume of their own voice without generating feedback or echo of the user's voice from the speaker back into the microphone receiving the user's voice.

Audio devices, such as headphones and/or earbuds can also operate in an active noise cancelling (ANC) mode of operation in which a microphone of the headphones and/or earbuds (and/or a connected electronic device) receives an audio signal including ambient noise from the environment around the headphones and/or earbuds, and generates an anti-noise signal that, when output by a speaker, cancels some or all of the ambient noise before the ambient noise is received in the ear canal of the user.

However, active noise cancellation operations can also cancel the user's own voice, which can work against the desire to provide a sidetone signal to allow the user to hear at least a version of their own voice. For example, the user's own voice can be suppressed or cancelled in an adaptive noise cancellation operation in which the active noise cancellation can be adapted to current audio conditions, which can cause the ANC operations to detect and cancel the user's own voice.

In accordance with aspects of the subject technology, concurrent sidetone and active noise cancellation (ANC) operations can be provided to allow for active noise cancellation to suppress ambient noise while still providing at least a version of the user's own voice to the user. In one or more implementations, ANC and/or sidetone operations can leverage information from a noise suppression block. In one or more implementations, the output of the noise suppression block can also be used for generating an uplink signal that includes (e.g., only) the user's own voice. Aspects of the subject technology described herein can provide various improvements to concurrent ANC and sidetone operations including, as examples, adjusting a gain of a sidetone signal based, in part, on an accelerometer signal, adjusting operation of the sidetone filter itself based, in part, on an accelerometer signal, and/or removing residual ambient noise from a sidetone signal with an ANC filter.

FIG. 1 illustrates an example electronic device in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In the example of FIG. 1, electronic device 100 has been implemented using a housing 106 that is sufficiently small to be portable and carried or worn by a user (e.g., electronic device 100 of FIG. 1 may be a handheld electronic device such as a tablet computer or a cellular telephone or smart phone or a wearable device such as a smart watch, a pendant device, a head mountable device, or the like). In the example of FIG. 1, electronic device 100 includes a display such as display 110 mounted on the front of a housing 106. However, in other implementations, the electronic device 100 may be provided without a display. Electronic device 100 may include one or more input/output devices such as a touch screen incorporated into display 110, a button, a switch, a dial, a crown, a touch sensor, an ultrasonic sensor, and/or other input output components disposed on or behind display 110 or on or behind other portions of housing 106. Display 110 and/or housing 106 may include one or more openings to accommodate a button, a speaker, a light source, or a camera (as examples).

In the example of FIG. 1, housing 106 includes openings 108. For example, openings 108 may form one or more respective ports for one or more respective audio components. In the example of FIG. 1, the electronic device 100 includes an opening 108 that forms a speaker port for a speaker 112 disposed within the housing 106, and another opening 108 that forms a microphone port for a microphone 114 disposed within the housing 106. In one more examples described herein, the microphone 114 may be referred to as a bottom microphone of the electronic device 100.

In the example of FIG. 1, display 110 also includes an opening 109. For example, opening 109 may form a port for one or more additional audio components. In the example of FIG. 1, the opening 109 forms a speaker port for another speaker 112 and a microphone port for a microphone 116 disposed within the housing 106 and behind a portion of the display 110. In one more examples described herein, the microphone 116 may be referred to as a top microphone of the electronic device 100. Although one bottom microphone and one top microphone are depicted in FIG. 1, it is appreciated that the electronic device 100 may include more than one top microphone, more than one bottom microphone, and/or one or more additional microphones, such as an error microphone positioned between a speaker, such as the speaker 112 mounted behind the display 110 and the port for that speaker.

In the example of FIG. 1, a top microphone (e.g., microphone 116) is located at the top of the electronic device 100 which, in the example of FIG. 1 may rest against the ear of a user in some use cases. In this example, a bottom microphone (e.g., microphone 114) is located at the bottom of the electronic device 100. In this example, a speaker 112 is also located at the bottom of the electronic device 100. In one or more implementations, the top microphone, the bottom microphone, and one or more additional microphones of the electronic device 100 may be used as a microphone array for purposes of pickup beamforming (spatial filtering) with beams that can be aligned in the direction of user's mouth and/or steered to a given direction. Similarly, the beamforming can also be controlled to exhibit nulls in other given directions.

In one or more use cases, one or more of the speakers 112 may generate a speaker output based, for example, on a downlink communications signal or a device-generated or streaming audio signal. In one or more implementations, the speaker(s) 112 may be driven by an output downlink signal that includes far-end acoustic signal components from a remote device. In one or more use cases, while a near-end user is using the electronic device 100 to input and/or transmit their own speech, ambient noise surrounding the user may also be present in the environment around the electronic device. Thus, the microphones 114 and 116 may capture the user's own speech as well as the ambient noise around the device 100. In a use case in which the electronic device 100 is used for a phone call or audio and/or video conference, a downlink signal or other audio signal that is output from the speaker(s) 112 may also be captured by the microphones 114 and 116, and if so, the output from the speaker 112 could be fed back in the near-end device's uplink signal to the far-end device's downlink signal. This downlink signal would in part drive the far-end device's loudspeaker, and thus, components of this downlink signal would be included in the near-end device's uplink signal that is transmitted to the far-end device as echo. Thus, the microphones 114 and 116 may receive a voice of the user of the electronic device 100, ambient near-noise, and/or one or more speaker outputs from the speaker(s) 112.

In various implementations, the housing 106 and/or the display 110 may also include other openings, such as openings for one or more microphones, one or more pressure sensors, one or more light sources, or other components that receive or provide signals from or to the environment external to the housing 106. Openings such as openings 108 and/or opening 109 may be open ports or may be completely or partially covered with a permeable membrane or a mesh structure that allows air and/or sound to pass through the openings. Although three openings (e.g., two openings 108 and one opening 109) are shown in FIG. 1, this is merely illustrative. One opening 108, two openings 108, or more than two openings 108 may be provided on the one or more sidewalls of the housing 106, on a rear surface of housing 106 and/or a front surface of housing 106. One opening 109, two openings 109, or more than two openings 109 may be provided in the display 110. In some implementations, one or more groups of openings 108 in housing 106 and/or groups of openings 109 in display 110 may be aligned with a single port of an audio component within housing 106. Housing 106, which may sometimes be referred to as a case, may be formed of plastic, glass, ceramics, fiber composites, metal (e.g., stainless steel, aluminum, etc.), other suitable materials, or a combination of any two or more of these materials.

The electronic device 100 also includes additional components such as processing circuitry (e.g., one or more processors), memory, a power source such as a battery, communications circuitry, and the like. As illustrated in FIG. 1, the electronic device may include one or more inertial sensors, such as an accelerometer 118. The accelerometer 118 may be a sensing device that measures proper acceleration in one, two, or three orthogonal directions. When a user of the electronic device is generating voiced speech, the vibrations of the user's vocal cords are filtered by the vocal tract and cause vibrations in the bones of the user's head which can be detected by the accelerometer 118. Although FIG. 1 illustrates a single accelerometer 118 located near the microphone 116, it is understood that the electronic device 100 may include multiple accelerometers in some implementations.

The configuration of electronic device 100 of FIG. 1 is merely illustrative. In other implementations, electronic device 100 may be a computer such as a computer that is integrated into a display such as a computer monitor, a laptop computer, a media player, a gaming device, a navigation device, a computer monitor, a television, a headphone, an earbud, or other electronic equipment. As discussed herein, in some implementations, electronic device 100 may be provided in the form of a smart phone. In one or more implementations, housing 106 may include one or more interfaces for mechanically coupling housing 106 to a strap or other structure for securing housing 106 to a wearer.

Figure 2:
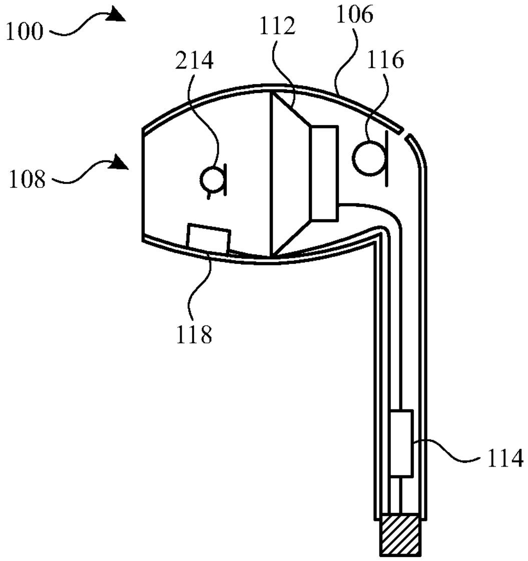
FIG. 2 illustrates a diagram of another example electronic device that may implement aspects of the subject technology in accordance with one or more implementations.

FIG. 2 illustrates another exemplary implementation of the electronic device 100, in which the aspects of the subject technology described herein may be implemented. Specifically, FIG. 2 illustrates an example of the electronic device 100 implemented as an earbud. In this example, the housing 106 is shaped for seating in the user's concha and for interfacing with the user's ear canal. In one or more implementations, the earbud of FIG. 2 may include processing circuitry that performs one or more of the operations described herein. In one or more other implementations, the earbud of FIG. 2 may be used in conjunction with another electronic device, such as a smartphone or tablet computer to which microphone signals received by the microphones 114 and 116 are transmitted and/or from which audio output signals for the speaker 112 are received.

Aspects of the subject technology described herein may be performed by one or more processors of the earbud of FIG. 2 and/or may be performed by a processor inside a smartphone or tablet computer, upon receiving the microphone signals from a wired or wireless data communication link with the earbud of FIG. 2. The electronic device 100 in the example of FIG. 2 may include communications circuitry for communicating with one or more other electronic devices via a wired or wireless connection. In use, microphones 114 and 116 in the earbud may receive the user's own voice when the user speaks. The earbud of FIG. 2 may be one of a pair of earbuds for a user's two ears. However, it is also understood that single earpiece or monaural headsets may also be used. Although an example is shown in FIG. 2 in which the electronic device 100 is implemented as an earbud, in other implementations, the electronic device 100 may be implemented as headphones including a pair of earcups that are configured to be placed over the user's ears. Further, the earbuds may be wired earbuds or untethered wireless earbuds that communicate with each other and with an external device such as a smartphone or a tablet computer via Bluetooth™ signals.

In the example of FIG. 2, the electronic device 100 includes a speaker 112, an inertial sensor for detecting movement or vibration of the earbud, such as an accelerometer 118, a top microphone (e.g., microphone 116) whose sound sensitive surface faces a direction that is opposite the eardrum of the user when the earbud is worn, and a bottom microphone (e.g., microphone 114) that is located in or near an end portion of the housing 106 of the earbud where it is the closest microphone to the user's mouth. In the example of FIG. 2, an error microphone 214 is also visible, in a position and orientation to receive an output from the speaker 112 and/or ambient sounds (e.g., ambient noise, voices of people other than the user of the electronic device 100, a voice of the user of the electronic device 100, or the like) that reach the error microphone. Although not visible in FIG. 1, the electronic device 100 in the implementation of FIG. 1 may also include one or more error microphones, such disposed in front of a speaker 112 that is arranged to be positioned adjacent a user's ear, when the device is in use.

In one or more implementations, the top and bottom microphones of FIG. 2 can be used as, or as part of, a microphone array for purposes of pickup beamforming. More specifically, the microphone arrays may be used to create microphone array beams which can be steered to a given direction by emphasizing and deemphasizing selected top and bottom microphones (e.g., to enhance pick up of the user's voice from the direction of their mouth). Similarly, the microphone array beamforming can also be configured to exhibit or provide pickup nulls in other given directions, to suppress pickup of an ambient noise source. Accordingly, the beamforming process, also referred to as spatial filtering, may be a signal processing technique using the microphone array for directional sound reception.

In one or more implementations, when the electronic device 100 is implemented as an earbud as in FIG. 2, the electronic device 100 may include a battery device, a processor, and a communication interface (not shown). The processor may be a digital signal processing chip that processes an audio signal(s) (e.g., microphone signal(s)) from at least one of the microphones 114 and 116 and/or the inertial sensor output from the accelerometer 118 (e.g., an accelerometer signal). The communication interface may include a Bluetooth™ receiver and transmitter to communicate acoustic signals from the microphones 114 and 116, and the inertial sensor output from the accelerometer 118 wirelessly in both directions (uplink and downlink), with an external device such as a smartphone or a tablet computer, in some implementations.

When a user of the electronic device 100 speaks, speech signals received by the microphones 114 and/or 116 of the electronic device 100 may include voiced speech and unvoiced speech. Voiced speech is speech that is generated with excitation or vibration of the user's vocal cords. In contrast, unvoiced speech is speech that is generated without excitation of the user's vocal cords. For example, unvoiced speech sounds include /s/, /sh/, /V, etc. Accordingly, in some embodiments, both types of speech (voiced and unvoiced) are detected in order to generate a voice activity detector (VAD) signal. In one or more implementations, an accelerometer signal from accelerometer 118, and/or signals from the microphones 114 and/or 116 may be used to detect the user's own voiced speech and/or the user's own unvoiced speech.

In one or more implementations, the accelerometer 118 may be used to detect low frequency speech signals (e.g., speech signals with frequencies of 800 Hz and below). In one more implementations, accelerometer signals from the accelerometer 118 may be low-pass filtered to mitigate interference from non-speech signal energy (e.g., audio signal with frequencies above 800 Hz), DC-filtered to mitigate DC energy bias, and/or modified to optimize the dynamic range to provide more resolution within a forced range that is expected to be produced by the bone conduction effect in the earbud.

As is discussed in further detail below, microphones 114 and/or 116, the accelerometer 118, the error microphone 214, and/or other microphones and/or inertial sensors of the electronic device 100 may be used, in conjunction with the architectures/components described herein, for adaptive noise cancellation and speech filtering for electronic devices.

Figure 3:
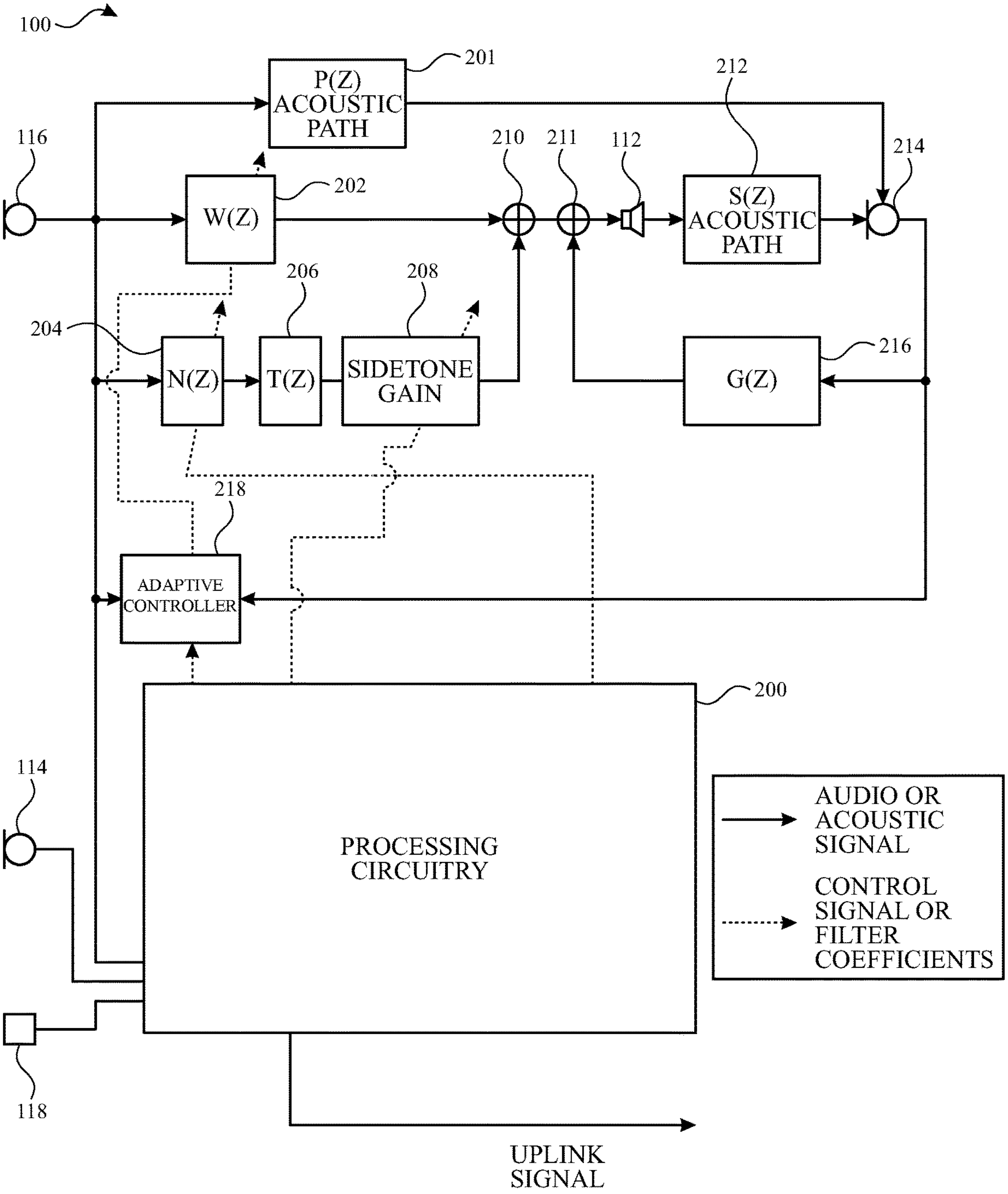
FIG. 3 illustrates a block diagram of an audio signal processing architecture for an electronic device in accordance with one or more implementations.

For example, FIG. 3 illustrates a high-level block diagram of an example implementation of the electronic device 100 with adaptive noise cancellation and speech filtering capabilities, in accordance with various aspects of the subject technology. In the example of FIG. 3, electronic device 100 includes the microphone 114, the microphone 116, an active noise cancellation (ANC) filter 202, a sidetone filter 204, processing circuitry 200, a gain stage 208, a summing circuit 210, a summing circuit 211, a transparency filter 206, an adaptive controller 218 for the ANC filter, the error microphone 214, a feedback filter 216, and the speaker 112. In the example of FIG. 3, element 201 represents an acoustic path P(z) representing all electrical, digital, and physical input (e.g., including any ambient sounds) that may be received by the error microphone 214, and element 212 represents an acoustic path S(z) between the speaker 112 and the error microphone 214.

In one or more implementations, the active noise cancellation filter 202 may be a variation of an optimal filter that can produce an estimate of the noise by filtering an audio signal corresponding to the microphone 116 (e.g., an audio signal received directly from the microphone 116 or an audio signal received by the microphone 116 and pre-processed prior to providing the audio signal to the ANC filter 202), and generating an anti-noise signal that can be output by the speaker 112 (e.g., included in the acoustic path represented by the element 212 of FIG. 3) to cancel the ambient noise from the environment (e.g., ambient noise in the acoustic path represented by 201 of FIG. 3). An estimate of the noise and a corresponding anti-noise signal can be produced, for example, by adaptive prediction and/or by using a prediction filter that exploits a low-pass characteristic of the audio signal. In one or more implementations, the active noise cancellation filter 202 can be implemented at least partially in hardware, firmware or software. The output of the active noise cancellation filter 202 may be an anti-noise signal configured to be output by the speaker 112 to cancel noise that enters the user's ear (e.g., via the acoustic path 201). In some aspects, the active noise cancellation filter 202 may not be able to distinguish between noise and the user's own voice (e.g., the user's self-voice). In some use cases, the user's self-voice may be at least partially removed from the audio signal by the ANC filter 202.

In one or more implementations, the sidetone filter 204 may also be used to filter noise (e.g., ambient noise) from the audio signal corresponding to (e.g., received from) the microphone 116, to produce a sidetone signal that includes a component (e.g., a self-voice component) corresponding to the voice of a user of the electronic device 100. In one or more implementations of the subject technology, the sidetone filter 204 can sample the audio signal corresponding to the microphone 116 at a very high rate (e.g., thousands of samples per second). As shown in FIG. 3, the sidetone signal generated by the sidetone filter 204 may also be amplified by the gain stage 208. In the example of FIG. 3, the gain stage 208 is implemented as a variable gain amplifier. The variable gain of the gain stage 208 may be controlled via a control signal produced by the processing circuitry 200. In one or more implementations, the sidetone filter 204 may also be a variable sidetone filter that is adjustable based on another control signal from the processing circuitry 200.

As illustrated in FIG. 3, the ANC filter 202 may generate an anti-noise signal to be output by the speaker 112 to destructively interfere with ambient noise that leaks past the housing 106 and into the user's ear canal. The leaked ambient noise and the anti-noise output of the speaker 112 (based on the anti-noise signal generated by the ANC filter 202) may be combined acoustically in the user's ear canal, intentionally in a destructive manner so as to result in a very small residual noise or error. The error microphone 214 may receive this residual noise or error, in addition to any user audio content (e.g., a voice or video call or a one-way digital media streaming or playback session) that is being simultaneously output by the speaker 112, and may provide an error signal to the feedback noise filter 216.

In the example of FIG. 3, the ANC filter 202 may be adaptively controlled by an adaptive controller 218 (e.g., which may be implemented as a coefficient generator for the ANC filter 202). As shown, the adaptive controller 218 may receive an error signal from the error microphone 214 and a microphone signal from the microphone 116, the microphone signal including a noise component due to ambient noise in the environment of the electronic device 100. This microphone signal may be used by the adaptive controller 218 (e.g., in accordance with a filtered-x, least mean squares (FXLMS) operation), to estimate primary and secondary path transfer functions. The ANC filter 202 may be an adaptive filter that operates using coefficients that are repeatedly or continually being updated by the adaptive controller 218 so as to drive the error signal from the error microphone to a minimum. It is also appreciated that other adaptive filter algorithms can be used by the adaptive controller 218, including adaptive filter algorithms that use different adaptive filter controllers.

When the electronic device is operating in an ANC mode, the adaptive controller 218 may perform computations that (e.g., continually) adjust or update filter coefficients of the ANC filter 202 based on the microphone signal from the microphone 116, in order to adapt the anti-noise signal to the changing ambient noise and acoustic load seen by the microphone 116 while the user is using the electronic device 100.

As one illustrative example of how the filter coefficients can be updated, the adaptive controller 218 may implement a leaky, least mean squares (LMS) adaptive algorithm in which a current coefficient is computed based on weighting a prior coefficient. According to such an algorithm, the filter coefficients can be updated in accordance with the following example relationship:

$$W(n) \sim \text{alpha}*W(n-1)+mu*e(n)*x(n)$$

where W(n) is an nth update to the filter coefficients, W(n−1) is the previous update; e(n) is the nth update to the ANC error or residual noise (which may be derived from the error microphone signal); x(n) is the nth update to the observed background or ambient noise which may be derived from the microphone signal; mu, also referred to as step size, is a constant that controls convergence of the adaptive algorithm; and alpha is a weighting fraction (0<alpha<=1) that when decreased serves to increase stability of the algorithm. For example, a high leakage may be selected to reduce ANC effects in quieter environments, while in louder environments the leakage may be made smaller so as to increase the strength of the ANC.

In one or more implementations of the subject technology, the processing circuitry 200 may modify the operation of the adaptive controller 218 based (e.g., in part) on an accelerometer signal from the accelerometer 118 (e.g., and/or based on one or more microphone signals from the microphones 114 and/or 116). For example, the processing circuitry 200 may provide an adaptation control signal to the adaptive controller 218 as illustrated in FIG. 3. In one or more implementations, the control signal from the processing circuitry 200 may variously enable or disable the adaptive controller 218 based on the accelerometer signal from the accelerometer 118 (e.g., and/or one or more microphone signals from the microphones 114 and/or 116), or may cause the adaptive controller 218 to freeze or modify the coefficients for the ANC filter 202 based on the accelerometer signal from the accelerometer 118 (e.g., and/or one or more microphone signals from the microphones 114 and/or 116).

For example, when the user of the electronic device 100 is speaking, full adaptive control of the ANC filter based on the microphone signal and the error signal may cause the ANC filter to suppress the user's own voice from being heard by the user. In one or more implementations, when the user's voice is detected by the processing circuitry 200 based on the accelerometer signal from the accelerometer 118 (e.g., and/or one or more microphone signals from the microphones 114 and/or 116), the adaptive controller 218 may be prevented from suppressing the user's voice by providing an adaptation control signal from the processing circuitry 200 to the adaptive controller 218, as illustrated in FIG. 3. In various examples, the adaptation control signal may include an instruction to the adaptive controller 218 to temporarily stop adapting. As examples, the adaptation control signal may cause the adaptive controller 218 to stop adapting by instructing the adaptive controller to freeze the ANC coefficients to the current coefficients and/or to obtain a predetermined static set of ANC coefficients, such as a default static set of coefficients, a most-recently-used set of static coefficients, or a mode-specific static set of coefficients (e.g., a set of static filter coefficients for an speech-detected mode) and to provide the frozen or predetermined static set to the ANC filter 202.

In one or more implementations, in order to provide smooth transitions between periods of time when the user is speaking and periods of time when the user is not speaking, the sidetone filter 204 may be operable, by the processing circuitry 200, to allow a residual portion of the noise component of the audio signal from the microphone 116 to pass through the sidetone filter 204. In one or more implementations, control of the adaptive controller 218 by the processing circuitry 200 may allow the ANC filter 202 to generate an anti-residual noise signal to cancel the residual noise portion of the sidetone signal (e.g., before the user receives that residual noise portion from the speaker 112). In various implementations, the anti-residual noise signal from the ANC filter 202 can be applied (e.g., by the summing circuit 210) to the sidetone signal from the gain stage 208 before the residual noise portion of the sidetone signal is output from the speaker, or the speaker 112 can be operated to output both the residual noise portion of the sidetone signal and the anti-residual noise signal from the ANC filter to acoustically cancel the residual noise.

As shown in FIG. 3, the processing circuitry 200 may receive the audio signal from the microphone 116, and may also receive a microphone signal from the microphone 114 and/or an accelerometer signal from the accelerometer 118. The processing circuitry 200 may generate control signals for the variable sidetone filter 204, the gain stage 208, and/or the adaptive controller 218 (e.g., including the adaptation control signal discussed above) based on the microphone signal from the microphone 116, the microphone signal from the microphone 114, and/or the acetometer signal from the accelerometer 118.

In one or more implementations, the sidetone filter 204, the transparency filter 206, the gain stage 208, the ANC filter 202, the feedback filter 216, the summing circuit 210, the summing circuit 211 and/or the adaptive controller 218 may be implemented at least partially by hardware, firmware, or software. In one or more implementations, some or all of the functionalities of the sidetone filter 204, the transparency filter 206, the gain stage 208, the ANC filter 202, the feedback filter 216, the summing circuit 210, the summing circuit 211 and/or the adaptive controller 218 may be performed by the processing circuitry 200, which may be implemented as a processor of a host device, such as a smartphone or a smartwatch or as a processor of a headphone or an earbud.

In the example of FIG. 3, the summing circuit 210 combines (e.g., adds) the amplified sidetone signal from the gain stage 208 to the anti-noise audio signal from the ANC filter 202. As can be seen in FIG. 3, in this arrangement, the sidetone filtering and gain operations are performed in a low-latency path, along with the ANC operations. In one or more implementations, the combination of the anti-noise signal with the amplified sidetone signal may cancel residual noise in the sidetone signal. In one or more implementations, the output of the summing circuit 210 may then be optionally combined, by the summing circuit 211, with an additional anti-noise signal from the feedback filter 216 to adaptively cancel any residual noise that may still be present at the error microphone 214 after output of the combined anti-noise and sidetone signals by the speaker 112. As shown, the summing circuit 211 may provide an output audio signal to the speaker 112 for output by the speaker 112. The output audio signal can include various amounts of the anti-noise audio signal and the sidetone (e.g., self-voice) signal that includes the voice of the user, at a controlled level, based on the control signals from the processing circuitry 200.

In one or more implementations, sidetone filter 204 may be implemented with variable frequency characteristics, which can include characteristics that define a passband (e.g., a mid-band frequency and a bandwidth of the passband, or lower and/or upper frequencies of the passband) and/or other frequency characteristics of the filter. In one or more implementations, the frequency characteristics of the variable sidetone filter 204 can be controlled by a control signal provided by the processing circuitry 200. For example, the processing circuitry 200 may generate control signals that control the gain of the gain stage 208 and/or the frequency characteristics of the sidetone filter 204 to provide a suitable self-voice level based on whether and/or how much of the user's own voice is detected by the processing circuitry 200 (e.g., using the microphone signals from the microphones 114 and 116 and/or based on the accelerometer signal from the accelerometer 118). In one or more implementations, the processing circuitry 200 may generate control signals that control the adaptive controller 218 for the ANC filter based on whether and/or how much of the user's own voice is detected by the processing circuitry 200 based on the microphone signals from the microphones 114 and 116 and/or based on the accelerometer signal from the accelerometer 118. This control of the adaptive controller 218 (e.g., and the variable sidetone filter and the sidetone gain stage) by the processing circuitry 200 can cause the ANC filter 202 to remove a residual portion of the ambient noise that is included in the sidetone signal from the gain stage 208.

For example, in one or more implementations (e.g., in order to be able to provide smooth transitions between ANC operations performed during user speech and ANC operations performed in the absence of user speech), the sidetone filter 204 may be adjusted to allow a residual portion of the ambient noise to remain in the sidetone signal when user speech is not detected. The ANC filter 202 can be adaptively controlled to remove this residual sidetone signal when no user speech is detected by the processing circuitry, to reduce or prevent adaptively removing the user's own speech when user speech is detected by the processing circuitry 200.

In this way, the electronic device 100 can provide improved concurrent ANC and sidetone operations, such as during a phone call with the electronic device 100 and/or during any other mode of operation in which ANC is active to suppress ambient noise and in which the user may desire to be able to hear their own voice when they speak (e.g., including when the user is listening to music or other media content being output by the speaker 112).

As illustrated in FIG. 3, in one or more implementations, the sidetone filter 204 may receive an audio signal corresponding to (e.g., generated by and received from, with or without pre-processing) a microphone such as the microphone 116 (e.g., a top microphone) and output a sidetone signal based on the audio signal. In one or more implementations, the processing circuitry 200 may receive an accelerometer signal from the accelerometer 118 (e.g., and/or the microphone signal from the microphone 114 and/or one or more additional microphone signals from one or more additional microphones such as the microphone 114), and adjust a gain of the sidetone signal based on the accelerometer signal from the accelerometer 118.

Optionally, as shown in FIG. 3, the processing circuitry 200 may also generate an uplink signal (e.g., for transmission to a remote device, such as during a phone call or an audio and/or video conference), based on the audio signal corresponding to the microphone 116, at least one additional audio signal corresponding to the at least one additional microphone (e.g., the microphone 114, such as a bottom microphone), and the accelerometer signal from the accelerometer 118. The uplink signal may be further processed, such as for echo cancellation or the like prior to transmission.

As shown in FIG. 3, the active noise cancellation filter 202 may generate an anti-noise signal corresponding to a noise component (e.g., an ambient noise component) of the audio signal, the anti-noise signal configured to cancel or suppress the noise component in the user's ear canal (e.g., when the anti-noise signal is output by the speaker 112). The processing circuitry 200 may modify the operation of the active noise cancellation filter 202 based on the accelerometer signal from the accelerometer 118 (e.g., and/or based on microphone signals from one or more microphones, such as the microphone 114 and/or the microphone 116).

Figure 4:
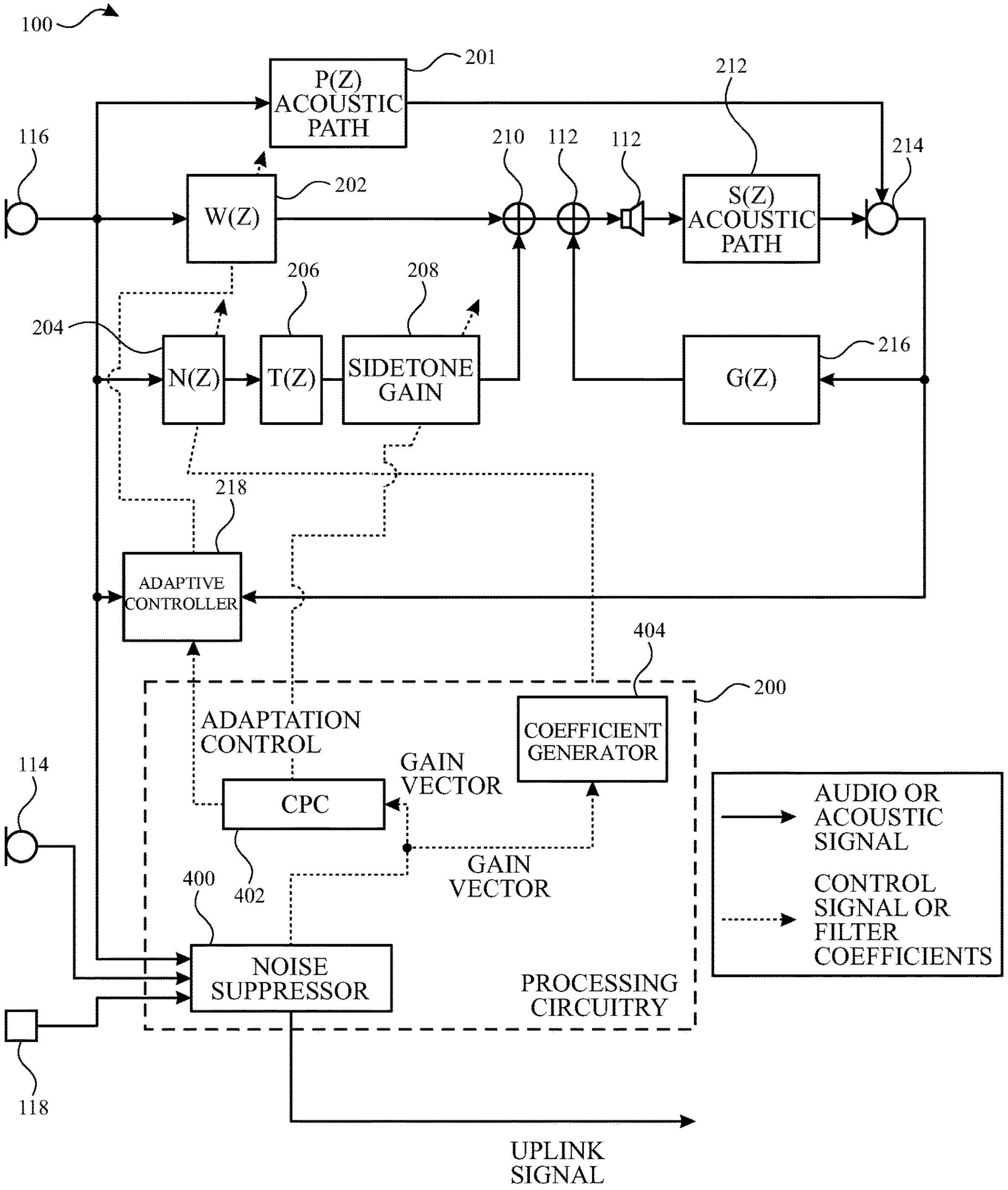
FIG. 4 illustrates additional details that may be implemented in the audio signal processing architecture of FIG. 3 in accordance with one or more implementations.

FIG. 4 illustrates additional details of the processing circuitry 200, in accordance with one or more implementations. As shown in FIG. 4, the processing circuitry 200 may include a noise suppressor 400, a control signal processor 402, and a coefficient generator 404 for the sidetone filter 204. As shown, in one or more implementations, the processing circuitry 200 may adjust the gain of the sidetone signal by generating a gain vector based on the accelerometer signal (e.g., and/or one or more microphone signals from the microphones 114 and/or 116), and adjust the gain of the sidetone signal using the gain vector. In one or more implementations, the gain vector may indicate, in one or more sub-bands of the audio signal(s) received from the microphone 116 and/or the microphone 114, a presence, a probability and/or an amount of the user's own voice that is present in that sub-band. For example, the gain vector may include a vector of binary values (e.g., integer values such as one or zero) indicating presence or no presence of speech a corresponding sub-band. In another example, the gain vector may include a vector of values each within a range indicates a probability and/or an amount of the user's own voice that is present in that sub-band.

As illustrated in FIG. 4, processing circuitry 200 may modify operation of the active noise cancellation filter 202 based on the accelerometer signal from the accelerometer 118 (e.g., and/or one or more microphone signals from the microphones 114 and/or 116) by generating the gain vector based on the accelerometer signal (e.g., and/or one or more microphone signals from the microphones 114 and/or 116), and generating (e.g., by the control signal processor 402) an adaptation control signal for the adaptive controller 218 (e.g., a coefficient generator) based the gain vector. In one or more implementations, the adaptation control signal may be used to activate and/or disable adaptive control by the coefficient generator, and/or to cause the coefficient generator to modify the coefficients being generated for the ANC filter 202.

As shown, the processing circuitry 200 (e.g., the coefficient generator 404) may also generate one or more coefficients for the sidetone filter 204 based on the gain vector (e.g., the gain vector generated by the noise suppressor 400). In one or more implementations, the gain vector may be a vector of values, each corresponding to a frequency or a frequency bin (e.g., a sub-band), that indicates whether and/or an amount of the user's own voice is detected at that frequency or bin (e.g., in that sub-band). In one or more implementations, the modified operation of the active noise cancellation filter 202 is configured to generate an anti-noise signal corresponding to a noise component of the audio signal and/or an anti-residual noise signal corresponding to a residual noise component of the sidetone signal, with which the ANC filter 202 can cancel the noise component of the audio signal from the microphone 116 and/or cancel the residual noise component of the sidetone signal.

As illustrated in FIG. 4, in one or more implementations, the processing circuitry 200 may receive an accelerometer signal from the accelerometer 118 (e.g., and/or one or more microphone signals from one or more microphones, such as the microphone 114 and/or the microphone 116), and generate (e.g., by the coefficient generator 404) one or more coefficients for the sidetone filter 204 based, at least in part, on the accelerometer signal (e.g., based on the gain vector generated by the noise suppressor 400 based on the accelerometer signal). As shown, the sidetone filter 204 may receive the one or more coefficients from the processing circuitry 200 (e.g., from the coefficient generator 404), receive an audio signal corresponding to the microphone 116, and generate, based on the one or more coefficients and the audio signal, a sidetone signal (e.g., including a component corresponding to the user's own voice and/or including a residual noise component). For example, as shown, the processing circuitry 200 may generate the one or more coefficients for the sidetone filter 204 based on the accelerometer signal by generating a gain vector based on the accelerometer signal, and generating the one or more coefficients for the sidetone filter based on the gain vector.

In one or more implementations, the coefficient generator 404 may be implemented as a finite impulse response filter (e.g., as a minimum phase finite response filter). The coefficient generator 404 may be configured to generate the one or more coefficients for the sidetone filter based on the gain vector.

In the example of FIG. 4, the electronic device 100 includes an active noise cancellation filter 202 configured to generate an anti-noise signal corresponding to a noise component of the audio signal. As shown in FIG. 4, the processing circuitry 200 may modify operation of the active noise cancellation filter 202 based on the accelerometer signal (e.g., and/or one or more microphone signals from one or more microphones, such as the microphone 114 and/or the microphone 116). For example, the adaptive controller 218 may generate one or more coefficients for the active noise cancellation filter 202 based on the audio signal from the microphone 116 and an error signal from an error microphone 214. In one or more examples, the processing circuitry 200 may modify the operation of the active noise cancellation filter 202 based on the accelerometer signal (e.g., and/or one or more microphone signals from one or more microphones, such as the microphone 114 and/or the microphone 116) by disabling adaptive control of the active noise cancellation filter by the adaptive controller 218 when the gain vector indicates a speech component in the accelerometer signal and the audio signal. For example, disabling the adaptive control of the active noise cancellation filter by the adaptive controller 218 may prevent the active noise cancellation filter 202 from generating an anti-noise signal corresponding to the speech component in the audio signal (e.g., by temporarily preventing the adaptive controller 218 from adapting the coefficients for the ANC filter 202 based on the audio signal from the microphone 116 when the user's voice is indicated to be present by the noise suppressor 400). In one or more other examples, the processing circuitry 200 may modify the operation of the active noise cancellation filter 202 based on the accelerometer signal (e.g., and/or one or more microphone signals from one or more microphones, such as the microphone 114 and/or the microphone 116) by causing the adaptive controller 218 to adjust the coefficients of the ANC filter 202 based on an amount of the user's own voice that is detected (e.g., by the noise suppressor 400) using the accelerometer signal and the audio signal.

In one or more implementations, the noise suppressor 400 receives and analyzes the audio signal from the microphone 116, the microphone 114, and/or the accelerometer 118, determines the presence and/or amount of the user's own voice that is present in one or more sub-bands, and generates the gain value based on the presence and/or amount of the user's own voice that is present. The control signal processor 402 may then set the gain (e.g., in each of several sub-bands) for the sidetone signal based on the gain vector. For example, when the gain vector indicates a relatively high probability of user speech presence in a sub-band, the gain of the gain stage 208 may be set to a higher value for that sub-band than the gain value for that sub-band is set when the gain vector indicates a relatively lower probability of user speech presence in a sub-band.

Figure 5:
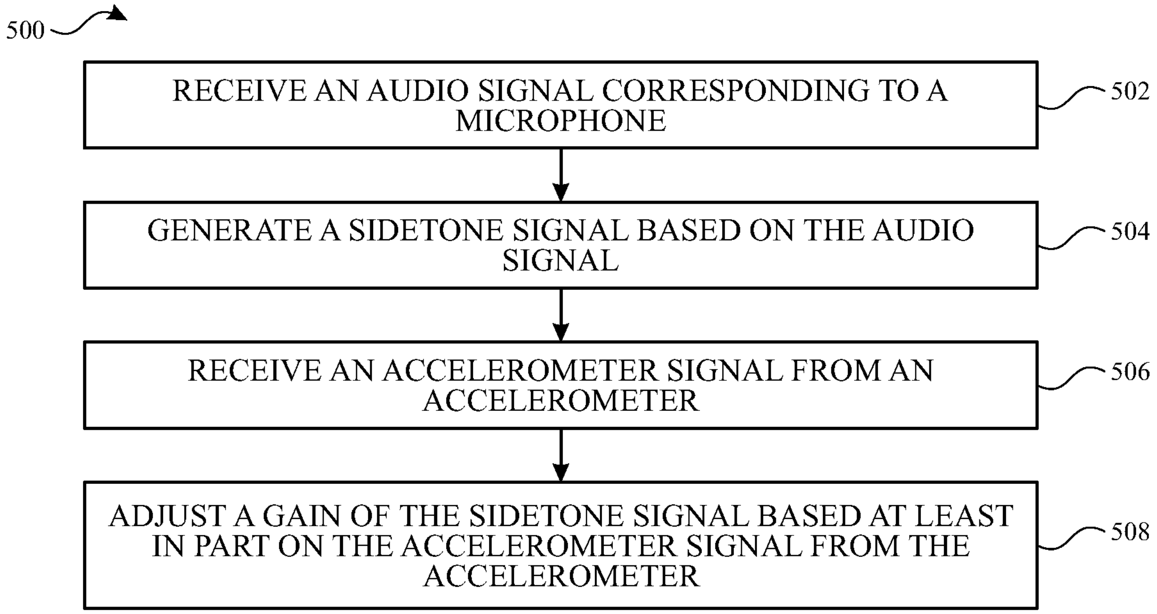
FIG. 5 illustrates a flow diagram of example process for generating a sidetone signal in accordance with one or more implementations.

FIG. 5 illustrates a flow diagram of an example process for operating an electronic device, in accordance with one or more implementations. For explanatory purposes, the process 500 is primarily described herein with reference to the electronic device 100 of FIG. 1 or 2. However, the process 500 is not limited to the electronic device 100 of FIG. 1 or 2, and one or more blocks (or operations) of the process 500 may be performed by one or more other components and other suitable devices. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

In one or more implementations, the process 500 may be performed by an electronic device (e.g., electronic device 100), while the electronic device is operating in an active noise cancellation (ANC) mode (e.g., a mode of operation in which the ANC filter 202 is active).

In the example of FIG. 5, at block 502, an electronic device (e.g., electronic device 100) may receive an audio signal corresponding to a microphone (e.g., microphone 116, such as a top microphone). For example, the audio signal corresponding to the microphone may be a microphone signal from the microphone, or may be an audio signal generated by performing pre-processing operations on the microphone signal. The audio signal may be received from the microphone at one or more processing blocks of the electronic device, such as at the ANC filter 202, the sidetone filter 204, the adaptive controller 218, and/or the noise suppressor 400 discussed herein.

At block 504, the electronic device (e.g., the sidetone filter 204) may generate a sidetone signal based on the audio signal. The sidetone signal may be an audio signal that includes a component corresponding to the voice of a user of the electronic device. In one or more implementations, the sidetone signal may also include a residual noise portion of a noise component of the audio signal corresponding to the microphone. In one or more implementations, the sidetone signal may be generated based at least in part on an accelerometer signal from an accelerometer, and/or based on an output of a noise suppressor (e.g., as described herein in connection with FIGS. 3 and 4).

At block 506, the electronic device may receive an accelerometer signal from an accelerometer (e.g., accelerometer 118). For example, the accelerometer 118 may detect vibrations caused by speech of a user of the electronic device when the user is speaking, and generate the accelerometer signal representative of the detected vibrations.

At block 508, the electronic device may adjust a gain of the sidetone signal based at least in part on the accelerometer signal from the accelerometer. In one or more implementations, the sidetone signal includes a component corresponding to a voice of a user of the electronic device, and the electronic device adjusts the gain of the sidetone signal by generating (e.g., by a noise suppressor, such as noise suppressor 400) a gain vector based on the accelerometer signal, and adjusting (e.g., by the control signal processor 402 and/or the gain stage 208) the gain of the sidetone signal using the gain vector (e.g., a described herein in connection with FIGS. 3 and 4).

In one or more implementations, the process 500 also includes generating, by the electronic device (e.g., by the noise suppressor 400), an uplink signal for transmission to a remote device, based on the audio signal corresponding to the microphone, at least one additional audio signal corresponding to at least one additional microphone (e.g., the microphone 114, such as a bottom microphone), and the accelerometer signal from the accelerometer.

In one or more implementations, the process 500 also includes generating (e.g., by the ANC filter 202) an anti-noise signal based at least in part on the accelerometer signal (e.g., and/or based on an output of a noise suppressor, such as the noise suppressor 400). For example, the electronic device may generate anti-noise signal based on the accelerometer signal by generating (e.g., by the noise suppressor 400) a gain vector based on the accelerometer signal (e.g., and/or based on one or more microphone signals), and by determining, based the gain vector (e.g., by a control signal processor 402), whether to adaptively control the generation of the anti-noise signal. In one or more implementations, the electronic device (e.g., processing circuitry 200, such as coefficient generator 404) may also generate one or more coefficients for generating the sidetone signal based on the gain vector. In one or more implementations, the electronic device (e.g., ANC filter 202, using coefficients generated by the adaptive controller 218 according to the adaptation control signal generated by the control signal processor 402 based on the gain vector generated by the noise suppressor 400) may generate the anti-noise signal to include an anti-residual noise signal corresponding to a residual noise component of the sidetone signal. In one or more implementations, the anti-noise signal from the ANC filter 202 may include an anti-noise signal configured to be output by the speaker 112 to acoustically cancel noise in the user's ear canal, and an anti-residual noise configured to electrically (or digitally) cancel (e.g., at the summing circuit 210) a residual noise portion of the sidetone signal prior to output of the sidetone signal.

Figure 6:
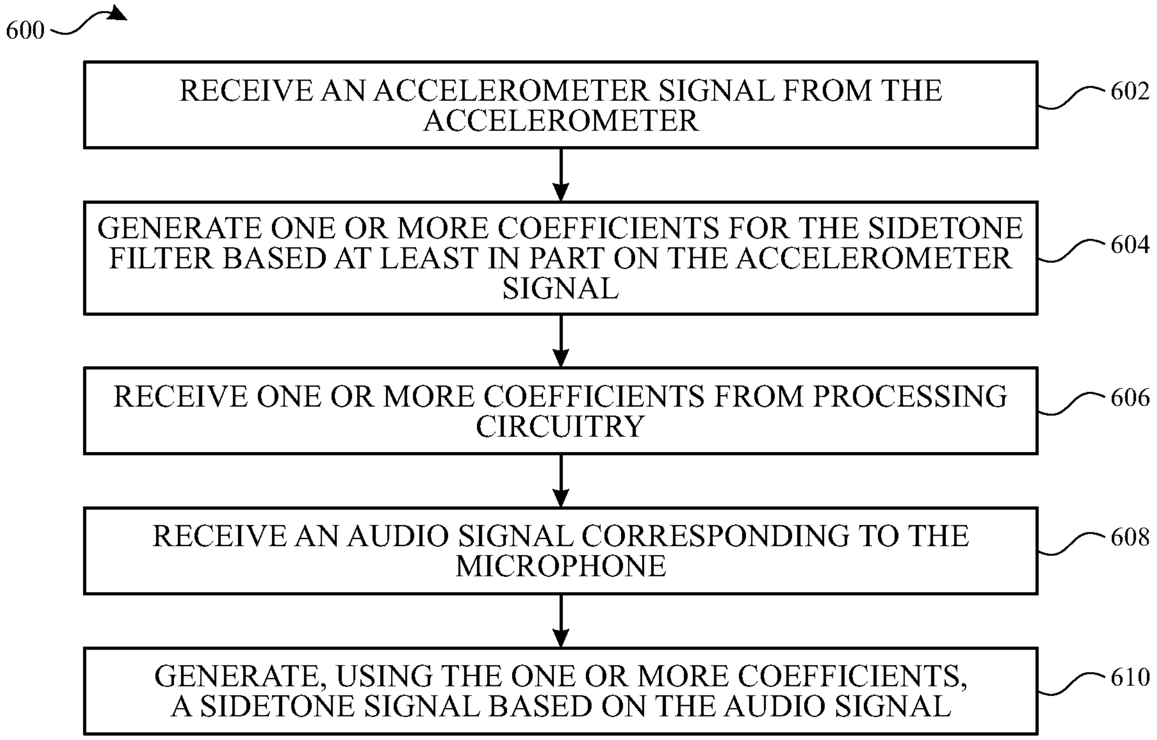
FIG. 6 illustrates a flow diagram of another example process for generating a sidetone signal in accordance with one or more implementations.

FIG. 6 illustrates a flow diagram of another example process for operating an electronic device in accordance with one or more implementations. For explanatory purposes, the process 600 is primarily described herein with reference to the electronic device 100 of FIG. 1 or 2. However, the process 600 is not limited to the electronic device 100 of FIG. 1 or 2, and one or more blocks (or operations) of the process 600 may be performed by one or more other components and other suitable devices. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

In one or more implementations, the process 600 may be performed by an electronic device, while the electronic device is operating in an active noise cancellation (ANC) mode. In the example of FIG. 6, at block 602, an electronic device (e.g., electronic device 100) may receive an accelerometer signal from the accelerometer (e.g., accelerometer 118). For example, the accelerometer signal may be generated responsive to vibrations of the accelerometer that vary depending on whether, and/or how much and/or how loudly a user of the electronic device is speaking at any given time.

At block 604, the electronic device (e.g., coefficient generator 404) may generate one or more coefficients for the sidetone filter based at least in part on the accelerometer signal. For example, the electronic device may generate the one or more coefficients for the sidetone filter based on the accelerometer signal by generating (e.g., by the noise suppressor 400) a gain vector based on the accelerometer signal, and generating (e.g., by the coefficient generator 404) the one or more coefficients for the sidetone filter based on the gain vector. In one or more implementations, the electronic device (e.g., the processing circuitry 200 of the electronic device 100) includes a minimum phase finite impulse response filter configured to generate the one or more coefficients for the sidetone filter based on the gain vector.

In one or more implementations, at block 606, the sidetone filter may, while the device is operating in the ANC mode, receive the one or more coefficients. For example, the sidetone filter may receive the one or more coefficients from the processing circuitry 200, such as from the coefficient generator 404, as discussed herein in connection with FIG. 4.

At block 608, the sidetone filter may receive an audio signal corresponding to a microphone (e.g., microphone 116, such as a top microphone). As examples, the audio signal corresponding to the microphone may be a microphone signal (e.g., directly) from the microphone, or may be an audio signal generated by performing pre-processing operations on the microphone signal generated by the microphone.

At block 610, the sidetone filter may generate, using the one or more coefficients, a sidetone signal based on the audio signal. For example, the one or more coefficients may cause the sidetone filter to generate an output signal (e.g., the sidetone signal) including a component corresponding to the voice of the user of the electronic device without other components of the original (incoming) audio signal, such as ambient noise and/or voices of other people. In one or more implementations, the sidetone signal may (e.g., intentionally or unintentionally) include a residual portion of an ambient noise component of the original (incoming) audio signal.

In one or more implementations, the process 600 may also include generating an uplink signal for transmission to a remote device, based on the audio signal corresponding to the microphone, at least one additional audio signal corresponding to the at least one additional microphone (e.g., the microphone 114, such as a bottom microphone), and the accelerometer signal from the accelerometer.

In one or more implementations, the process 600 may also include (e.g., by an active noise cancellation filter such as ANC filter 202) generating an anti-noise signal corresponding to a noise component of the audio signal. In one or more implementations, the electronic device (e.g., the processing circuitry 200) may modify operation of the active noise cancellation filter based on the accelerometer signal. For example, the electronic device may include an adaptive controller (e.g., adaptive controller 218) for the active noise cancellation filter. The adaptive controller may to generate one or more coefficients for the active noise cancellation filter based on the audio signal from the microphone and an error signal from an error microphone, in one or more implementations.

In one or more implementations, the electronic device (e.g., the processing circuitry 200 of the electronic device 100) may modify the operation of the active noise cancellation filter based on the accelerometer signal, such as by disabling adaptive control of the active noise cancellation filter by the adaptive controller when a gain vector (e.g., the gain vector on which the coefficients of the sidetone filter are based) indicates a speech component in the accelerometer signal and/or the audio signal. For example, disabling the adaptive control of the active noise cancellation filter by the adaptive controller may prevent the active noise cancellation filter from generating an anti-noise signal corresponding to the speech component in the audio signal.

Figure 7:
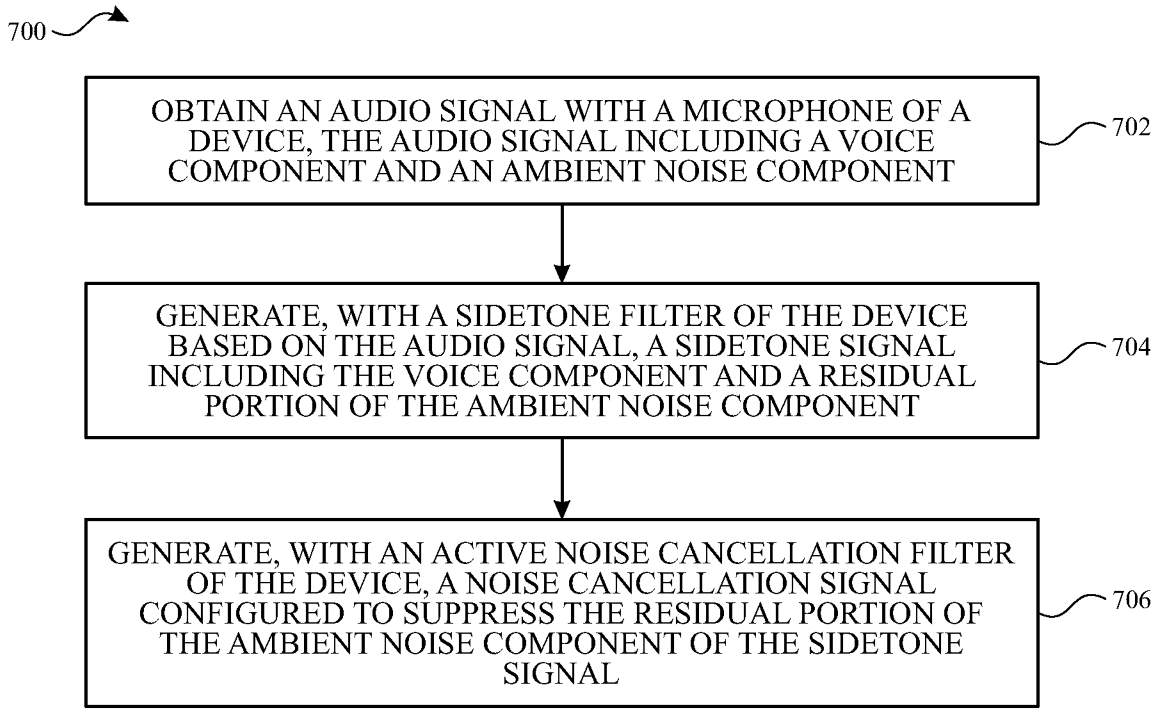
FIG. 7 illustrates a flow diagram of an example process for generating a sidetone signal in part using an active noise cancellation process in accordance with one or more implementations.
Figure 8:
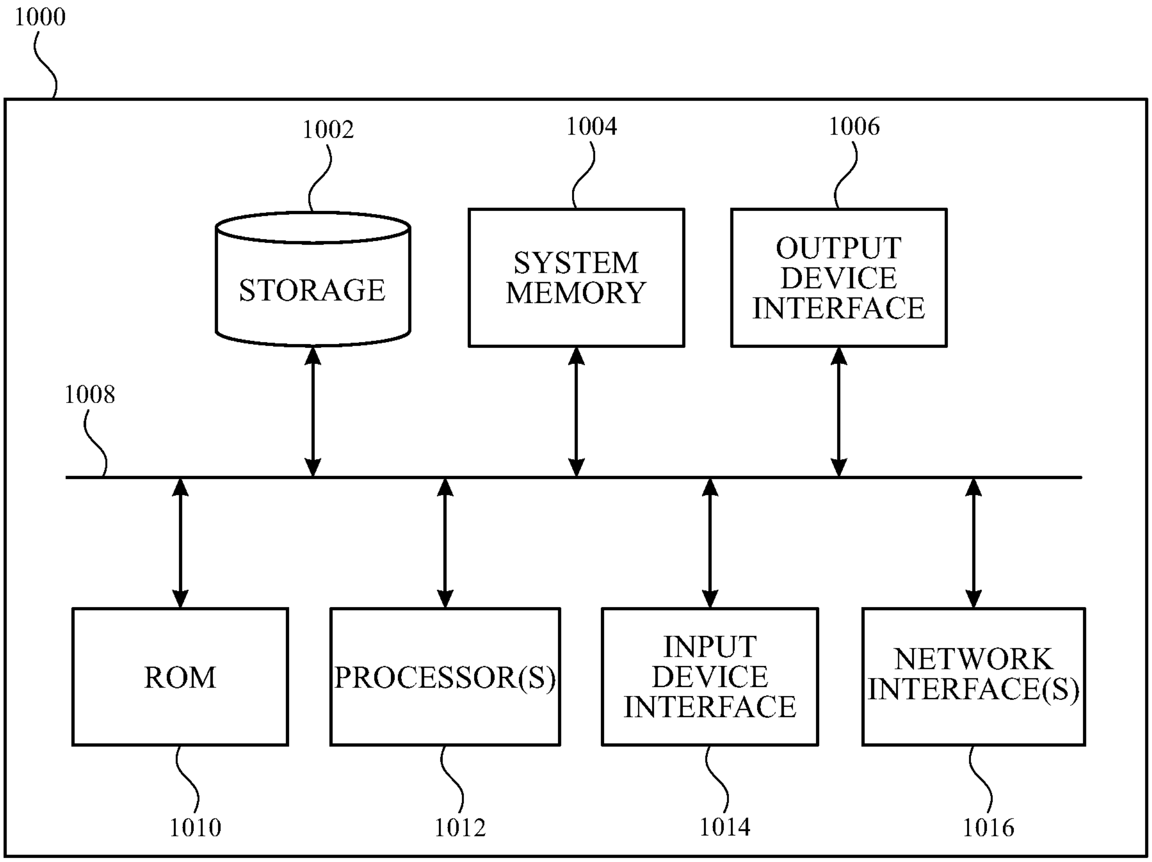
FIG. 8 illustrates an example electronic system with which aspects of the subject technology may be implemented in accordance with one or more implementations.

FIG. 7 illustrates a flow diagram of another example process for operating an electronic device in accordance with one or more implementations. For explanatory purposes, the process 700 is primarily described herein with reference to the electronic device 100 of FIG. 1 or 2. However, the process 700 is not limited to the electronic device 100 of FIG. 1 or 2, and one or more blocks (or operations) of the process 700 may be performed by one or more other components and other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

In the example of FIG. 7, at block 702, a device (e.g., electronic device 100) may obtain an audio signal with a microphone (e.g., microphone 116) of the device. For example, the audio signal may include a voice component and an ambient noise component.

At block 704, the device may generate, with a sidetone filter (e.g., sidetone filter 204) of the device and based on the audio signal, a sidetone signal including the voice component and a residual portion of the ambient noise component. For example, the residual portion may be a remaining portion of the ambient noise component that has been processed based at least in part on an accelerometer signal from an accelerometer. For example, based at least in part on the accelerometer signal from the accelerometer (e.g., based on the gain vector generated by the noise suppressor based at least in part on the accelerometer signal from the accelerometer), the coefficient generator 404 may generate coefficients for the sidetone filter 204 that cause the sidetone filter 204 to allow the remaining portion of the ambient noise component to remain in the sidetone signal.

At block 706, the device may generate, with an active noise cancellation filter (e.g., ANC filter 202) of the device, a noise cancellation signal (also referred to herein as an anti-noise signal) configured to suppress the residual portion of the ambient noise component of the sidetone signal. In one or more implementations, the noise cancellation signal may suppress the residual portion of the ambient noise component of the sidetone signal when the noise cancellation signal is combined with the sidetone signal (e.g., by the summing circuit 210), before the residual portion of the ambient noise component is output by the speaker 112. In one or more implementations, the noise cancellation signal also includes an anti-noise component configured to, upon output by the speaker 112, destructively interfere with the ambient noise in the user's ear canal to acoustically cancel or suppress the ambient noise.

In one or more implementations, the process 700 may also include determining (e.g., by the processing circuitry 200, such as by the control signal processor 402) a gain based on the accelerometer signal from the accelerometer (e.g., accelerometer 118) of the device, and applying (e.g., by the gain stage 208) the gain to the sidetone signal. In one or more implementations, the process 700 may also include determining (e.g., by the processing circuitry 200, such as by the coefficient generator 404) one or more coefficients for the sidetone filter based on the accelerometer signal (e.g., based on the gain vector that is generated by the noise suppressor 400 based on the accelerometer signal and/or one or more microphone signals). In one or more implementations, the process 700 may also include generating (e.g., by the adaptive controller 218) one or more additional coefficients for the active noise cancellation filter based on the accelerometer signal (e.g., based on an adaptation control signal that is generated by the control signal processor 402 based on the gain vector that is generated by the noise suppressor 400 based on the accelerometer signal and/or one or more microphone signals).

In one or more implementations, generating the sidetone signal including the voice component and the residual portion of the ambient noise component with the sidetone filter at block 704 may include generating the sidetone signal including the voice component and the residual portion of the ambient noise component with the sidetone filter using the one or more coefficients, and generating the noise cancellation signal configured to suppress the residual portion of the ambient noise component of the sidetone signal at block 706 may include generating, with the active noise cancellation filter, the noise cancellation signal using the one or more additional coefficients.

In one or more implementations, the sidetone filter is implemented, along with the active noise cancellation filter, in a low latency signal processing path. In one or more implementations, the process 700 may also include generating an uplink signal including the voice component of the audio signal for transmission to a remote device. The uplink signal may be transmitted to the remote device, such as during a telephone call or a video conference.

As described above, one aspect of the present technology is the gathering and use of data available from specific and legitimate sources for providing user information in association with processing audio and/or non-audio signals. The present disclosure contemplates that in some instances, this gathered data may include personal information data that uniquely identifies or can be used to identify a specific person. Such personal information data can include voice data, demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for operating an electronic device to provide active noise cancellation and/or sidetone operations that allow a user to hear their own voice during various modes of operation of the electronic device. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the U.S., collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of operating an electronic device to provide active noise cancellation and/or sidetone operations that allow a user to hear their own voice during various modes of operation of the electronic device, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

FIG. 10 illustrates an electronic system 1000 with which one or more implementations of the subject technology may be implemented. The electronic system 1000 can be, and/or can be a part of, one or more of the electronic device 100 shown in FIGS. 1-4. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAIVI, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms “base station”, “receiver”, “computer”, “server”, “processor”, and “memory” all refer to electronic or other technological devices. These terms exclude people or groups of people. For the purposes of the specification, the terms “display” or “displaying” means displaying on an electronic device.

As used herein, the phrase “at least one of” preceding a series of items, with the term “and” or “or” to separate any of the items, modifies the list as a whole, rather than each member of the list (i.e., each item). The phrase “at least one of” does not require selection of at least one of each item listed; rather, the phrase allows a meaning that includes at least one of any one of the items, and/or at least one of any combination of the items, and/or at least one of each of the items. By way of example, the phrases “at least one of A, B, and C” or “at least one of A, B, or C” each refer to only A, only B, or only C; any combination of A, B, and C; and/or at least one of each of A, B, and C.

The predicate words “configured to”, “operable to”, and “programmed to” do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word “exemplary” is used herein to mean “serving as an example, instance, or illustration”. Any embodiment described herein as “exemplary” or as an “example” is not necessarily to be construed as preferred or advantageous over other implementations. Furthermore, to the extent that the term “include”, “have”, or the like is used in the description or the claims, such term is intended to be inclusive in a manner similar to the term “comprise” as “comprise” is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase “means for” or, in the case of a method claim, the element is recited using the phrase “step for”.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
memory; and
processing circuitry configured to:
while operating in an active noise cancellation (ANC) mode:
receive an audio signal corresponding to a microphone;
output a sidetone signal based on the audio signal;
receive an accelerometer signal from an accelerometer;
generate a gain vector based on the accelerometer signal; and
adjust a gain of the sidetone signal based at least in part on the gain vector generated using the accelerometer signal from the accelerometer.

2. The device of claim 1, wherein the processing circuitry is further configured to generate an uplink signal for transmission to a remote device, based on the audio signal corresponding to the microphone, at least one additional audio signal corresponding to at least one additional microphone, and the accelerometer signal from the accelerometer.

3. The device of claim 1, wherein the sidetone signal comprises a component corresponding to a voice of a user of the device.

4. The device of claim 1, wherein the processing circuitry is further configured to generate an anti-noise signal based at least in part on the accelerometer signal.

5. The device of claim 4, wherein the processing circuitry is configured to generate the anti-noise signal based on the accelerometer signal by generating a gain vector based on the accelerometer signal, and by determining whether to adaptively control the generation of the anti-noise signal based on the gain vector.

6. The device of claim 5, wherein the processing circuitry is further configured to generate one or more coefficients for generating the sidetone signal based on the gain vector.

7. The device of claim 6, wherein the processing circuitry is configured to generate the anti-noise signal to include an anti-residual noise signal corresponding to a residual noise component of the sidetone signal.

8. A non-transitory computer-readable medium storing instructions which, when executed by one or more processors, cause the one or more processors to:
while a device operating in an active noise cancellation (ANC) mode:
receive an audio signal corresponding to a microphone of the device;
output a sidetone signal based on the audio signal;
receive an accelerometer signal from an accelerometer of the device;
generate a gain vector based on the accelerometer signal; and
adjust a gain of the sidetone signal based at least in part on the gain vector generated using the accelerometer signal from the accelerometer.

9. The non-transitory computer-readable medium of claim 8, wherein the instructions, when executed by the one or more processors, further cause the one or more processors to generate an uplink signal for transmission to a remote device, based on the audio signal corresponding to the microphone, at least one additional audio signal corresponding to at least one additional microphone, and the accelerometer signal from the accelerometer.

10. The non-transitory computer-readable medium of claim 8, wherein the sidetone signal comprises a component corresponding to a voice of a user of the device.

11. The non-transitory computer-readable medium of claim 8, wherein the instructions, when executed by the one or more processors, further cause the one or more processors to generate an anti-noise signal based at least in part on the accelerometer signal.

12. The non-transitory computer-readable medium of claim 11, wherein the instructions, when executed by the one or more processors, further cause the one or more processors to generate the anti-noise signal based on the accelerometer signal by generating a gain vector based on the accelerometer signal, and by determining whether to adaptively control the generation of the anti-noise signal based the gain vector.

13. The non-transitory computer-readable medium of claim 12, wherein the instructions, when executed by the one or more processors, further cause the one or more processors to generate the anti-noise signal to include an anti-residual noise signal corresponding to a residual noise component of the sidetone signal.

14. The non-transitory computer-readable medium of claim 8, wherein the instructions, when executed by the one or more processors, further cause the one or more processors to generate one or more coefficients for generating the sidetone signal based on the gain vector.

15. A method, comprising:
while a device of a user is operating in an active noise cancellation (ANC) mode:
receiving an audio signal corresponding to a microphone of the device;
outputting a sidetone signal based on the audio signal;
receiving an accelerometer signal from an accelerometer of the device;
determining a presence or an amount of a voice of the user based on the accelerometer signal; and
adjusting a gain of the sidetone signal based at least in part on the presence or amount of the voice of the user as determined based on the accelerometer signal from the accelerometer.

16. The method of claim 15, further comprising generating an uplink signal for transmission to a remote device, based on the audio signal corresponding to the microphone, at least one additional audio signal corresponding to at least one additional microphone, and the accelerometer signal from the accelerometer.

17. The method of claim 15, wherein the sidetone signal comprises a component corresponding to a voice of a user of the device, and wherein the method comprises adjusting the gain of the sidetone signal by generating a gain vector that indicates the presence or amount of the voice of the user.

18. The method of claim 17, further comprising generating one or more coefficients for generating the sidetone signal based on the gain vector.

19. The method of claim 15, further comprising generating an anti-noise signal based at least in part on the accelerometer signal.

20. The method of claim 19, wherein generating the anti-noise signal based on the accelerometer signal comprises generating a gain vector based on the accelerometer signal, and determining whether to adaptively control the generation of the anti-noise signal based on the gain vector.

21. The method of claim 20, further comprising generating the anti-noise signal to include an anti-residual noise signal corresponding to a residual noise component of the sidetone signal.

* * * * *